United States Patent

Ebner

[15] 3,683,368

[45] Aug. 8, 1972

[54] DIGITAL ENCODING TRANSDUCER

[72] Inventor: Theran L. Ebner, Houston, Tex.

[73] Assignee: Houston Natural Gas Corporation, Houston, Tex.

[22] Filed: Oct. 22, 1970

[21] Appl. No.: 83,132

[52] U.S. Cl. ..................340/347 P

[51] Int. Cl. ..................G08c 9/08

[58] Field of Search ..................340/347 P

[56] References Cited

UNITED STATES PATENTS

| | | | |
|---|---|---|---|
| 3,314,063 | 4/1967 | Brothman et al. | 340/347 P |
| 3,165,733 | 1/1965 | Brothman et al. | 340/347 P |
| 3,445,841 | 5/1969 | Parkinson | 340/347 P |
| 3,286,251 | 11/1966 | Byun et al. | 340/347 P |
| 3,054,996 | 9/1962 | Spaulding et al. | 340/347 P |

*Primary Examiner*—Thomas A. Robinson
*Attorney*—James F. Weiler, Jefferson D. Giller, William A. Stout, Paul L. DeVerter, II, Dudley R. Dobie, Jr. and Henry W. Hope

[57] ABSTRACT

A digital encoding transducer for measuring the angular position of a plurality of rotatable shafts which form a part of a gear type register or counter. A digital encoding transducer which provides accurate encoding and which includes error detecting and correcting means which detects and corrects positional errors in the coded transducer.

8 Claims, 8 Drawing Figures

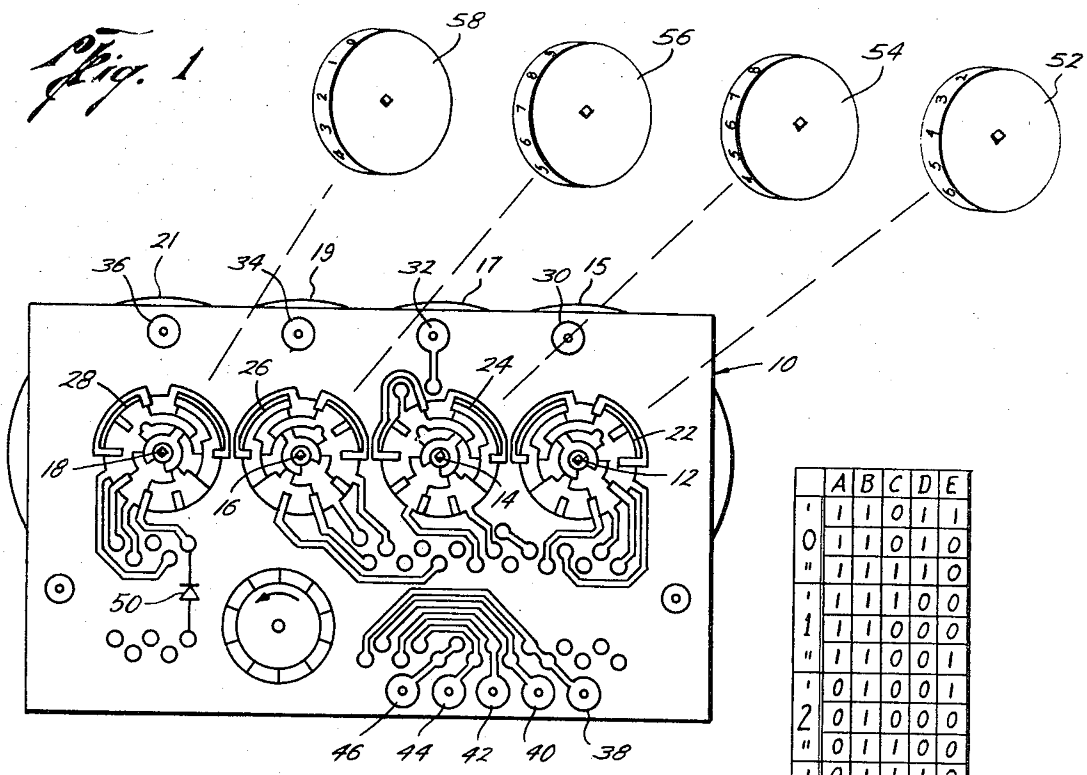
Fig. 1
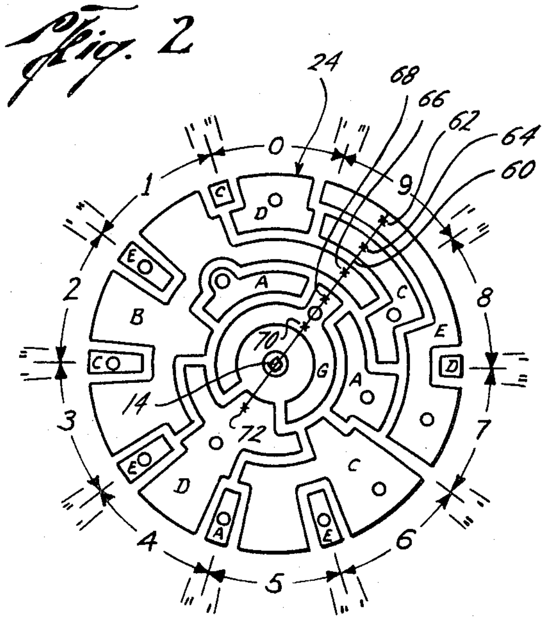
Fig. 2
Fig. 3
| | A | B | C | D | E |
|---|---|---|---|---|---|
| 0 ' | 1 | 1 | 0 | 1 | 1 |
| 0 | 1 | 1 | 0 | 1 | 0 |
| 0 " | 1 | 1 | 1 | 1 | 0 |
| 1 ' | 1 | 1 | 1 | 0 | 0 |
| 1 | 1 | 1 | 0 | 0 | 0 |
| 1 " | 1 | 1 | 0 | 0 | 1 |
| 2 ' | 0 | 1 | 0 | 0 | 1 |
| 2 | 0 | 1 | 0 | 0 | 0 |
| 2 " | 0 | 1 | 1 | 0 | 0 |
| 3 ' | 0 | 1 | 1 | 1 | 0 |
| 3 | 0 | 1 | 0 | 1 | 0 |
| 3 " | 0 | 1 | 0 | 1 | 1 |
| 4 ' | 0 | 0 | 0 | 1 | 1 |
| 4 | 0 | 0 | 0 | 1 | 0 |
| 4 " | 1 | 0 | 0 | 1 | 0 |
| 5 ' | 1 | 0 | 1 | 1 | 0 |
| 5 | 0 | 0 | 1 | 1 | 0 |
| 5 " | 0 | 0 | 1 | 1 | 1 |
| 6 ' | 0 | 0 | 1 | 0 | 1 |
| 6 | 0 | 0 | 1 | 0 | 0 |
| 6 " | 1 | 0 | 1 | 0 | 0 |
| 7 ' | 1 | 0 | 0 | 0 | 0 |
| 7 | 1 | 0 | 0 | 0 | 1 |
| 7 " | 1 | 0 | 0 | 1 | 1 |
| 8 ' | 1 | 0 | 1 | 1 | 1 |
| 8 | 1 | 0 | 1 | 0 | 1 |
| 8 " | 1 | 1 | 1 | 0 | 1 |
| 9 ' | 0 | 1 | 1 | 0 | 1 |
| 9 | 0 | 1 | 1 | 1 | 1 |
| 9 " | 1 | 1 | 1 | 1 | 1 |
Theran L. Ebner
INVENTOR.
BY James F. Weiler
William A. Stout
ATTORNEYS Theran L. Ebner
INVENTOR
BY James F. Weiler
William A. Stout
ATTORNEYS Theran L. Ebner
INVENTOR.

BY James F. Weiler
William A. Stout
ATTORNEYS

DIGITAL ENCODING TRANSDUCER

BACKGROUND OF THE INVENTION

Electrically reading rotatable shaft counters such as the gear type register found in the typical gas, light or water meter are old. However, gears in a typical counter are loosely meshed and the shaft bearings are loosely fitted. The combined effect of these two conditions as well as other misalignment problems allows substantial latitude in the rotational position of the pointer or counter. No serious effect is produced by these conditions except when the true position of the pointer is at or near the transition point from one number to the next higher number on the scale. However, near the transition position the pointers are easily misread visually. And, of course, any electrical system of reading such a counter or register will suffer the same effect unless steps are taken to recognize the error and/or correct the error.

The present invention is directed to providing a digital encoding transducer which will accurately encode the angular position of the counter shafts and in which means are provided for detecting and correcting for mechanical errors or inaccuracies in the position of the counter components. In particular, the present invention provides a digital encoding transducer which will accurately encode the angular position of the rotatable shafts in a gear type register and which will correct for slack in the gears, loosely fit shaft bearings, misplaced electrical brush wipers, brush wear, eccentricity of switch patterns and other mechanical defects which would cause the counter to read incorrectly.

SUMMARY

The present invention generally relates to a digital encoding transducer for electrically encoding the reading or angular position of a plurality of rotatable shafts which form a part of a counter or register such as a gear type register and which has a digital coding format to minimize errors in measuring or reading the counter.

A still further object of the present invention is the provision of a digital encoding transducer having means for detecting errors in measurements of the transducer and correcting said errors.

A typical rotatable shaft counter serves as a mechanical memory device recording the number of turns of its input shaft. For electrically reading the angular position of the shafts electric brushes or wipers are connected thereto and rotate relative to a coded switch pattern to transform the angular mechanical position into an electrical signal. In order to provide an accurate electric signal the brush-switch pattern combination of the present invention provides that (1) there are no ambiguous positions or gaps, (2) the error introduced by the loss or transposition of a bit causes as insignificant an error as possible in the reading, (3) the change in bits from the code for one number to the code for the next number is limited to one, (4) the code includes information in addition to the numerical content which will allow the detection and correction of positional errors of the wiper relative to the switch pattern, (5) the code is reasonably well balanced with respect to bits in the 1 and 0 columns in order to optimize the requirements of electrical transmission, (6) the code is limited to a minimum number of bits to provide a minimum number of switch pattern rings and wiper brushes, (7) the switch pattern code is such that there is no electrical gap between numbers by limiting the change from one number to the next by adding or dropping a one bit, (8) the code always contains at least one binary 1 so that lack of contact with the ground ring is an encoded condition (00000) which signifies that the true position is unidentifiable and (9) all unused brushes are in electrical contact with some segment of the pattern to provide a plurality of connections to each bit segment in so far as possible and minimize brush contact wear.

An object of the present invention is to provide such a switch pattern and code as that shown in FIGS. 2 and 3 of the drawings.

A further object of the present invention is the provision of an electrical circuit for comparing the decoded lower order number with the next higher order number to determine if the higher order number contains an error, and if so, to correct the higher order number.

It is therefore an object of the present invention to provide a digital encoding transducer having a rotary switch pattern which includes a plurality of segments formed in five rings and positioned to measure thirty angular positions and forming a five bit code with the segments positioned wherein the change in code between adjacent positions is only one bit and in which six brushes are provided for rotative movement over the switch pattern segments and the segments are positioned whereby each brush will contact only one segment at a time.

A further object is the provision wherein the thirty angular positions include ten numbered positions with each numbered position including an interface positioned at each end of each number position, and in which the interface positions are angularly larger than the positional errors of the brushes relative to the segments, and including an error detecting and correcting circuit for detecting and correcting the positional errors of the brushes relative to the segments.

BRIEF DESCRIPTION OF THE DRAWINGS

FIG. 1 is an exploded, isometric view of one embodiment of the invention as installed on a typical gas metering device, FIG. 2 is an enlarged view of the preferred switch pattern for encoding the angular position of the rotatable shafts of FIG. 1, FIG. 3 is the preferable digital coding format for the switch pattern of FIG. 2.

DESCRIPTION OF THE PREFERRED EMBODIMENT

Figures 4, 7:
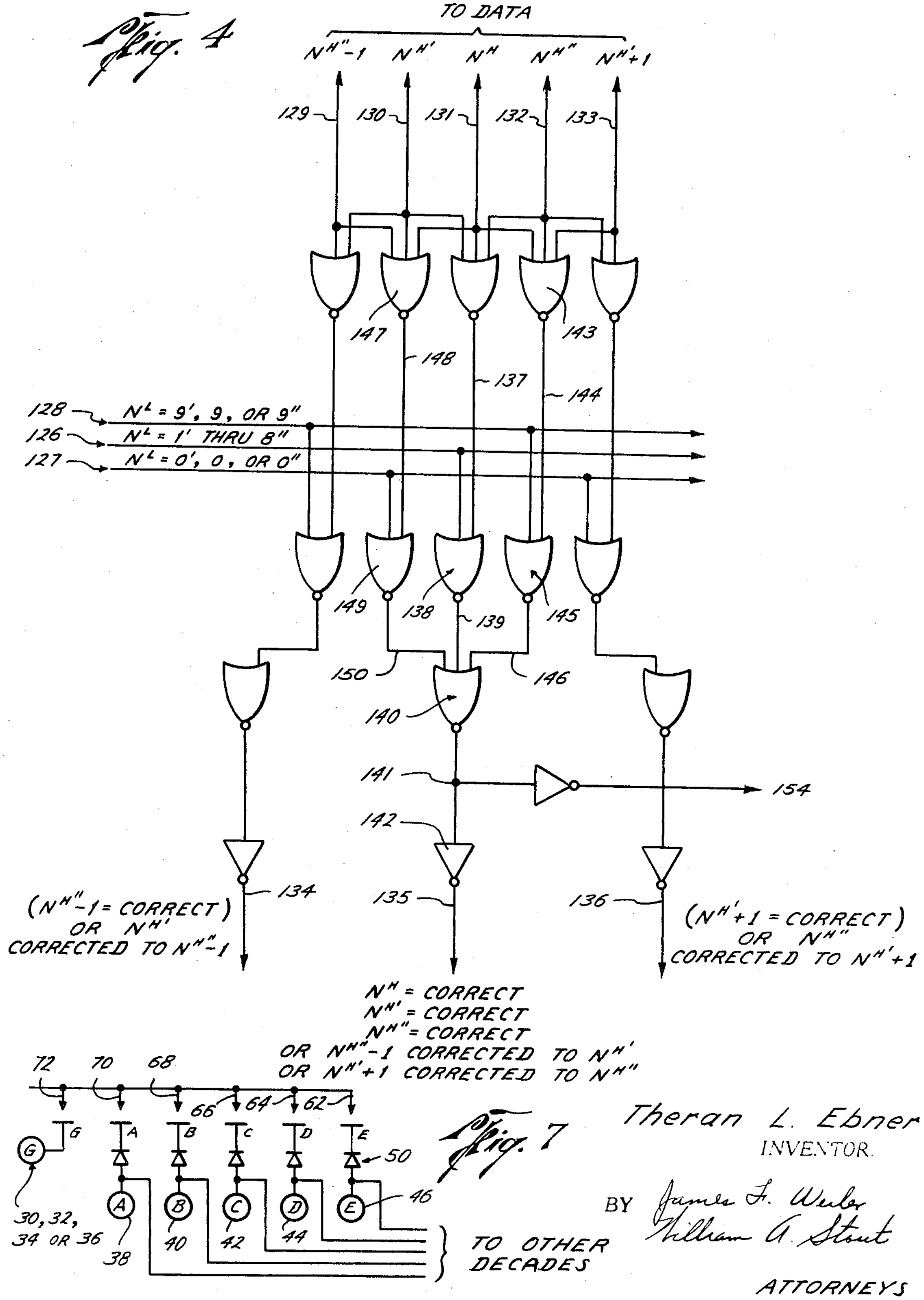
FIG. 4 is an electrical schematic of the logic circuit for detecting and correcting positional errors in the counter of FIG. 1.
FIG. 7 is an electrical schematic illustrating the scanning of one switch pattern.

For purposes of convenience, the present invention will be described as relating to a means of encoding into electrical impulses the reading or angular position of a plurality of rotatable shafts which are part of a gear type register such as may be found on a typical household utility gas, light or water meter, but it is also to be recognized that the present invention may be used in numerous other applications for control or measurement of the shaft rotational position of devices such as machinery, valves, and odometer type devices. And while the present invention may be used to measure the angular position of any number of shafts, it will be shown for purposes of illustration as measuring a gas register having four shafts.

Thus, referring to FIG. 1, a gear type counter or register is generally indicated by the reference numeral 10 and is shown as a typical gas metering register which serves as a mechanical memory device recording the number of turns of an input shaft. The apparatus 10 is normally geared using appropriate ratios so that the shafts 12, 14, 16 and 18 indicate or read in 10 increments each of $10^2$, $10^3$, $10^4$, and $10^5$ cubic feet, respectively. In a normal register 10, pointers (not shown) are normally attached to the end of each of the shafts 12, 14, 16 and 18 and rotate over scales (not shown) printed on the face of the register 10.

The shafts 12, 14, 16 and 18, are normally driven by an interconnected conventional gear train including gears 15, 17, 19 and 21.

However, gears in a typical register or counter are very loosely meshed and gear shaft bearings have a very loose fit. The combined effect of these two conditions as well as other mechanical misalignments allows substantial latitude in the rotational position of the mechanical pointers. No serious effect is produced by these conditions except when the true position of the pointer is at or near the transition point from one number to the next higher number on the scale. In a transitional position, the pointers are easily misread visually. Any automated system or system of electrical reading by means of an electrical transducer will suffer the same effects.

In addition, an electrical transducer will be subject to further positional errors such as misaligning the brushes or wipers on the shafts, brush wear, and other inaccuracies in the transducer.

Therefore, the present invention is directed to providing a digital encoding transducer which contains a rotary switch pattern which may be used for each of the rotatable shafts 12, 14, 16 and 18, here shown as switch patterns 22, 24, 26 and 28, respectively with switch pattern 24 shown in enlarged form in FIG. 2. Four connector plugs 30, 32, 34 and 36 are provided connected to the "G" or ground ring of the decade switch patterns 22, 24, 26 and 28, respectively. Also, five connector plugs 38, 40, 42, 44 and 46, each one of which is connected through diode matrices, as best seen in FIG. 7 generally indicated by reference numeral 50, to the A, B, C, D and E segments, respectively, of each of the switch patterns 22, 24, 26 and 28. The diode matrices 50 serve to isolate the segments A, B, C, D or E of one switch pattern from the effects of other switch patterns during the encoding sequence.

Referring again to FIG. 1, switch wiper or brush assemblies 52, 54, 56 and 58 are attached to the shafts 12, 14, 16 and 18, respectively, each of which includes a set of six brushes electrically connected together, one of which is best seen in FIG. 2 as wiper 60 having brushes 62, 64, 66, 68, 70 and 72. Thus the wipers, the ones not shown being similar to 60, each rotate with one of the shafts 12, 14, 16 and 18 to electrically connect together the segments A, B, C, D and E of their respective switch patterns 22, 24, 26 and 28 which are required to produce the code combination assigned to their particular rotational position. In addition, numerals are engraved on the rims or front of the wiper assemblies 52–58 thereby making it possible to read the meter 10 visually in addition to the automated electrical reading equipment that has been added to the register 10.

The wiper assemblies 52 and 56 will rotate in a clockwise direction for increasing quantities while wipers 54 and 58 will rotate in a counterclockwise direction for increasing quantities due to the normal gear arrangement of the gear type register 10. Similarly, the switch patterns 22 and 26, are arranged in code in a clockwise direction while switch patterns 24 and 28 encode in a counterclockwise direction. Thus, switch patterns 24 and 28 are identical, and switch pattern 24 is shown in FIG. 2, while switch patterns 22 and 26 are mirror images of switch pattern 24 in order to transpose the angular position of the shafts 12, 14, 16 and 18 into suitable electrical signals by digital encoding.

Another feature of the present invention is the provision of an encoding switch pattern that will provide accurate measurement of the shaft angular position. Since the movement of the wiper assemblies 52–58 may be infinitesimal between readings, the encoding switch patterns 22–28 must be of a design such that at any time the positions of the wipers 52–58 are accurately encoded. Therefore, the wiper switch pattern segments of the present invention are positioned such that there is no "gap" into which a brush may be positioned at the time of the reading and therefore encode an incorrect or ambiguous reading. Secondly, the digital bit code is such that the error introduced by the loss of or transposition from a bit causes as insignificant an error as possible in the reading, Thirdly, the change in bits from the code for one number to the code for the next number is limited to one thereby minimizing the error resulting from misplacement of a bit. Fourthly, the switch pattern encoded includes information in addition to the numeral content which will allow detection and correction of positional errors of the brushes relative to the segments which may be the result of slack in the gears, misalignment of the shaft bearings, misplaced brushes, brush wear and other manufacturing inaccuracies. Fifthly, the code is reasonably well balanced with respect to bits in the 1 and 0 columns in order to optimize the band width requirement for transmitting the electrical signals. Sixthly, the code is limited to a minimum number of bits so that a minimum number of rings and brushes are required in the switch pattern because of limited space available. Seventhly, the code permits the design of a switch pattern having segments for each numerical position which can be arranged so that the change from one segment to the next is limited to adding or dropping a one bit so that from an electrical standpoint there is no gap or ambiguous position. Eighthly, the code always contains at least one binary 1 whereby an encoded condition (00000) indicates a lack of ground signifying an unidentifiable position. Ninthly, the pattern uses the unused brushes to provide a plurality of connections to a bit sequence and reduce brush wear.

The preferred embodiment of the switch pattern for measuring a ten numbering system is best shown in FIG. 2 where switch pattern 24 is shown in an enlarged view along with a 5 bit code table of connections, as shown in FIG. 3, produced by the wiper 60 when positioned in each of the possible rotational or angular positions. It is to be noted that the switch pattern has a plurality of segments forming a five bit code and measures thirty angular positions. The 30 angular positions include 10 numbered positions 0 through 9 with each numbered position including an interface positioned at each end of each numbered position. The upper interface position is designated and encoded as N'' and the lower interface position is designated and encoded as N', where N is the digit number of the numbered position. It is to be noted that the wiper 60, shown graphically in FIG. 2 in position 9 connects the segments E, C, B, and D together to the ground G in this position. Referring to the code in FIG. 3, a 1 indicates a connection to the ground segment G from the segment column where 1 appears. And 0 indicates no connection.

The rotary switch pattern shown in FIG. 2 and the code shown in FIG. 3 has all of the nine advantages previously mentioned. That is, the wiper 60 which includes the brushes 62–72 separately encodes all of the thirty positions without giving an ambiguous reading and always gives a definite position reading. Secondly, the change in bits from one position to the next adjacent position is limited to one and thus the five bit code shown in FIG. 3 cyclically changes one bit. Thirdly, the error caused by the loss of or transposition of a bit (from 1 to 0) in a code causes an insignificant error as possible in the reading as compared to other codes such as the use of a weighted binary code wherein the loss of an eight bit would be significant. Fourthly, by encoding 30 positions, as will be more fully discussed hereinafter, the code includes information in addition to the numerical content of the numerals 0 through 9, which will allow detection and correction of positional errors of the brushes of wiper 60 relative to the switch pattern 24 due to the various mechanical misalignments. Fifthly, the five bit code shown in FIG. 3 is well balanced with respect to the bits in the 1 and 0 columns to optimize band width requirements for signal transmission. Sixthly, the code shown in FIG. 3 is limited to a minimum number of bits, here a five bit code, so that a minimum number of rings, here shown as five rings are used in the positioning of the segments of the switch pattern 24, and six brushes, to minimize the space required by the switch patterns. Seventhly, the switch pattern code 24 has the segments for each numerical position arranged so that there is no electrical gap between adjacent positions. That is, the brushes will not overlap and make contact with two segments at any time, but the bit change from one segment to the next segment is limited to adding or dropping a one bit. Eighthly, the code in FIG. 3 encodes all positions with at least one binary 1 whereby the encoded position 00000 indicates a fault to provide a check. Ninthly, the unused brushes at any position are used as backups to provide a plurality of connections to the bits used if possible. For example in position 7 only one brush need actually contact segments A and E and G. However, the pattern provides for two brushes contacting each of A, E and G thereby using the unused brushes to reinforce the electrical contact to segments A, E and G. In the pattern of FIG. 2, unused brushes reinforce brushes providing signals in 20 of the 30 positions and in 29 of the 30 positions two brushes are in contact with the ground ring G thereby increasing the electrically reliability of the pattern. This feature also reduces brush wear since the segments A, B, C, D, E and G are less abrasive than the aerial board base material on which the segments are mounted.

In order to keep the switch pattern ring requirements to a minimum number, the digital code requires the code byte for the number with the highest number of 1 bits to have at least one of the bits in common with the number physically opposite it in the switch pattern. Thus, the number 9'' which has the highest number of one bits, has one of its bits, the D segment, in common with the number 4 oppositely positioned in the switch pattern. Meeting this requirement permits the switch pattern to include the same number of rings as the maximum number of bits positions occupied by a 1 in any code byte, here shown as five rings. In addition, note that the wiper 60 has a wiper contact which contacts the G ring in all numerical positions of the wiper 60 except 4 where it contacts the D bit segment. This design feature allows the use of a five segment ring zone instead of six.

Referring now to FIGS. 1 and 7, a suitable and conventional scanner and encoding circuit is provided connected to the ground connectors 30, 32, 34 and 36 and the bit segments A, B, C, D and E to sequentially apply a voltage to each of the bit segments A, B, C, D and E in turn, one cycle for each decade, here shown as a total of four complete cycles. This sequence is referred to as the bit scan. And the circuit also functions to sequentially apply a ground return circuit to the G or ground ring of each decade switch pattern 22, 24, 26 and 28 in turn. During the first cycle of the bit scan, a ground is applied to the switch pattern 22. During the second cycle of the bit scan, switch pattern 24 is grounded and so forth. Only one switch pattern is grounded during each bit scan cycle. And thus even though a signal is applied to one of the terminal connectors such as 38 which is connected to all of the A segments which are connected to all four switch patterns 22–28, only the switch pattern whose G ring is connected to ground affects the signal. And, of course, the diodes 50 in each of the bit lines to each switch pattern prevent paths between the switch patterns 22–28. Such a scanning and encoding circuit is composed of conventional equipment and is known to those skilled in the art and no further description is believed to be necessary.

As previously mentioned, the use of a thirty position switch pattern provides the means for detecting and correcting positional errors of the brushes relative to the segments of the switch pattern. For an understanding of the corrective technique used, refer now to FIG.

5 wherein three adjacent numbers in any one decade is shown with the number on numerical position 70 indicated as N, its higher interface position 72 indicated as N'' and its lower interface position 74 indicated as N'. The next lower number 76 is N − 1 and the number next higher than N is 78 which would be N + 1. Of course, N +1 and N − 1 also have upper and lower interface positions, as indicated. All of the interface positions 72 and 74 must be larger than the positional errors of the brushes of the wiper 60 relative to the segments of the switch pattern, but in the preferred embodiment, the width of the interface positions is preferably 10 percent of the numbered positions although of course they can be larger or smaller as desired.

Figure 6:
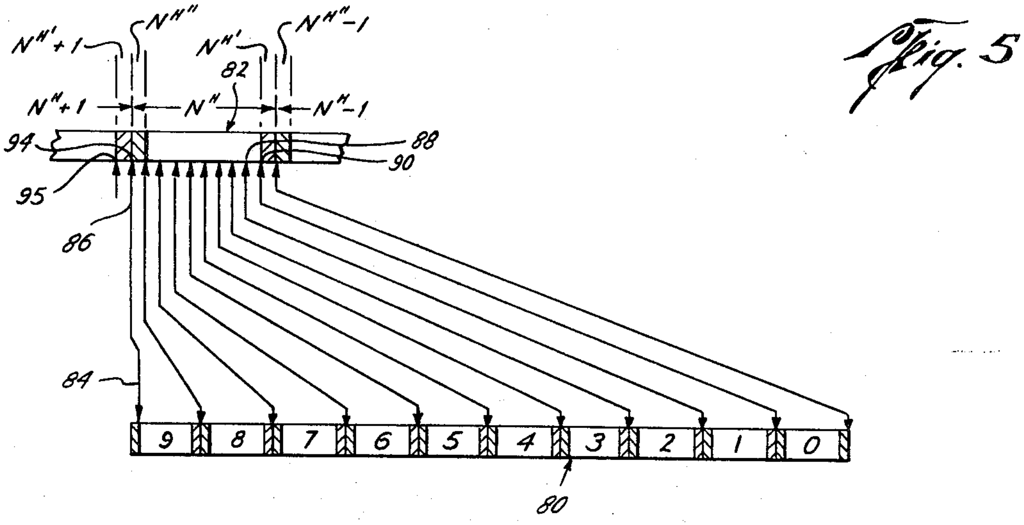
FIG. 6 is a partial linear schematic representation of the relationship between a lower order and a higher order scale.

Referring now to FIG. 6, the corresponding relative position of the brushes for a lower order decade and of a higher order decade is best seen. Thus the lower order decade in linear form is represented by the numeral 80 and a portion of the higher order decade is represented by the numeral 82. It is assumed that the lower order decade wiper position is always correct. Any errors resulting from this assumption will be limited to plus or minus 1 unit quantity and such error will only be possible at a transitional point between the numbers and therefore will be relatively insignificant as compared to errors at the transitional point of higher order decades. Since the lower order switch pattern, here 22 is always assumed to be correct, it is unnecessary that pattern 22 be of the thirty position type shown in FIG. 2. In fact, a simple ten position pattern is sufficient as the interfaces are not required. However, the pattern 22 may be constructed as the other patterns for convenience of reference.

If there were no positional errors of the brushes relative to the higher order decades, the position of a lower order brush 84 as it moves across the numbered positions of the lower decade 80, as shown in FIG. 6, would correspond to the position of a brush 86, as also shown in FIG. 6, moving across the higher order decade 82.

However, if the higher order decade wipers have positional errors such as slack in the gears, they will be moved from their true position. However, since it is assumed that the order of positional error is less than the amount of one of the interface positions, it is noted that when the lower order brush 84 is in a position encoding digits 1-8 that the upper order brush 84 will remain within $N^H$ in spite of positional errors and no correction is necessary.

However, it is apparent under the assumed conditions that when the lower order decade 80 is reading either 0 or 9, that positional errors in the upper order brush 86 could result in a numerically incorrect upper order reading if the brush is lagging or leading from its true position.

Thus if the upper order wiper 86 lags from wiper position 88 to wiper position 90 it would lag from the numbered position $N^H$ to the position $N^{H'}$, but numerically the reading encoded would still be correct and no correction would be necessary.

Referring now to upper order brush 86 at position 94 and assume that it is the true position for the higher order decade wiper. In this position 94 will encode $N^{H''}$. However, if the wiper leads and is positioned at 95 it will encode $N^{H'} + \mathbf{1}$; and if it lags, it will encode $N^H$.

The lagging wiper reading $N^H$ is still numerically correct. However, the leading wiper reading $N^{H'} + 1$ is numerically incorrect. Therefore, from FIG. 6 it is noted that when the lower order number reading on lower order decade 80 is 9', 9 or 9'', the higher order reading $N^H$ must be $N^{H''}$. If $N^H$ is coded as $N^{H'} + 1$, the $N^H$ wiper is leading and the reading may be corrected by subtracting 1 and changing ' to ''.

Corrective action for all of the possible combinations are given in the following table:

TABLE I

| $N^L$ | $N^H$ | $N^H$ Wiper Fault | Corrective Action to $N^H$ |
|---|---|---|---|
| 0' | $N^{H'}$ | None | None |
| 0' | $N^H$ | Leading | Add ' |
| 0' | $N^{H''}$ | Lagging | Add 1 and Change to ' |
| 0 | $N^{H'}$ | None | None |
| 0 | $N^H$ | Leading | Add ' |
| 0 | $N^{H''}$ | Lagging | Add 1 and Change to ' |
| 0'' | $N^{H'}$ | None | None |
| 0'' | $N^H$ | Leading | Add ' |
| 0'' | $N^{H''}$ | Lagging | Add 1 and Change to ' |
| 9' | $N^{H'}$ | Leading | Subtract 1 and Change to '' |
| 9' | $N^H$ | Lagging | Add'' |
| 9' | $N^{H''}$ | None | None |
| 9 | $N^{H'}$ | Leading | Subtract 1 and Change to '' |
| 9 | $N^H$ | Lagging | Add'' |
| 9 | $N^{H''}$ | None | None |
| 9'' | $N^{H'}$ | Leading | Subtract 1 and Change to '' |
| 9'' | $N^H$ | Lagging | Add'' |
| 9'' | $N^{H''}$ | None | None |

In order to detect and correct for the positional errors noted, the receiving device receiving the encoded signals from the transducer 10 is provided to compare the decoded $N^L$ (lower order number) number to the $N^H$ (higher order number) number and correct it if necessary. The receiver then compares the first $N^H$ number to its next higher decade. Corrections, if necessary, are applied only to the higher order decade number in each comparison. Corrections are based on correct or corrected next lower order decades. Three comparisons are made in order to complete the reading verification and/or correction.

Referring now to FIG. 4, a logic circuit is shown which detects and performs the corrective actions required that are set forth in Table I. A signal is derived during the decoding of the lowest order decade $N^L$ and is applied to either lines 126, 127 or 128, as will be more fully discussed hereinafter, in preparation for decoding the next higher order decade $N^H$. Thus decoding begins with the least significant decade and proceeds in ascending order through each of the higher order decade readings and as the decoding progresses the decade previously decoded generates a signal which is applied to either lines 126, 127 or 128, depending upon the number being decoded, and which functions as $N^L$ to the decade under decoding. The signal from the lower order decade $N^L$ is supplied to line 126–128 at the same time that data is applied to lines 129–133 from the upper order decades $N^H$.

For the following description assume that in every example, $N^L$ is the $\mathbf{10^2}$ decade of the meter register 10 and the reading is stored in the data memory of a receiver and $N^H$ is the $10^3$ decade digit also stored in the data memory. Assume further that in this instance the decoding of $N^L$ has just been completed and the circuit in FIG. 4 is about to decode $N^H$. At this instant, lines 126–128 do not have a signal present (they are Hi) and lines 129–133 likewise are not receiving a signal (they are Lo). Under these conditions output lines 134, 135 and 136 are Lo (no output).

Example 1 No Correction Required to $10^3$ Digit

This condition exists when the $N^L$ ($10^2$) digit is decoded and found to be any number and inclusive between 1′ and 8″.

When the decode $10^3$ command signal occurs, a signal (Lo) is applied to 126. At the same instant a data signal (Hi) is applied to either 130, 131 or 132 (Since the position error is less than an interface). Assuming that 131 receives the signal (that is, the upper order code reads $N^H$), (Hi), 137 goes Lo. NOR Gate 138 now has two Lo signals at its input, (126 and 137) and 139, therefore, goes Hi.

NOR Gate 140 output 141 goes Lo, inverter 142 output 135 goes Hi and the digit is available to the output memory circuitry without correction.

Note that a data signal to either 130 or 132 (that is, the upper order code reads $N^H$ or $N^H$ ) would have had the same effect upon the circuit, that is the data would have been steered through NOR Gate 138.

EXAMPLE 2 POSSIBLE CORRECTION REQUIRED TO $N^H$ ($10^3$) DIGIT

A. Digit may be High due to leading wiper contacts.

This condition may exist when the ($10^2$) digit is decoded and found to be a 9′,9 or 9″.

When the decode $10^3$ command signal occurs, a signal (Lo) is applied to 128. At the same instant a data signal is applied to 132 or 133. If the wiper contacts are correctly positioned, the signal would be $N^{H''}$ and would be applied to 132. If the wiper is leading the signal would be $N^{H'}+1$ and applied to 133.

Note that a signal (Hi) to either 132 or 133 is applied to NOR Gate 143 and causes 144 to go Lo. NOR Gate 145 now has both inputs, 144 and 128, Lo and 146 goes Hi. NOR Gate 140 and inverter 142 respond as in Example 1 and the signal (133) which was received and decoded as $N^{H'}+1$ has been corrected to $N^{H''}$. Assuming that $N^{H'}+1$ was 6′ (incorrect due to a leading wiper), it has been changed to 5″ (correct).

It is pertinent to note that a lagging wiper contact would have caused the data signal to be decoded and applied to 131. NOR Gate 143 would respond and the end result would be $N^H$ corrected to $N^{H''}$ (or 5 corrected to 5″).

B. Digit may be Low due to a lagging wiper contact.

This condition may exist when the $N^L$ ($10^2$) digit is decoded and found to be a 0′, 0 or 0″.

When the decode $10^3$ command signal occurs, a signal (Lo) is applied to 127. At the same instant a data signal (Hi) is applied to 130 or 129. If the wiper contacts are correctly positioned the signal will be applied to 130, if the wiper is lagging it will be applied to 129.

Not that a signal (Hi) to either 129 or 130 will cause NOR Gate 147 output 148 to go Lo. Nor Gate 149 then has both inputs 127 and 148 Lo and 150 goes Hi.

NOR Gate 140 and inverter 142 respond as in Example 1 and the signal (129) which was received and decoded as $N^{H''}-1$ has been corrected to $N^{H'}$. Assuming that $N^{H'}-1$ was 4″ (incorrect due to a lagging wiper), it has been corrected to 5′.

It is pertinent to note that a leading wiper contact would have caused the data signal to be decoded and applied to 131. NOR Gate 147 would have been $N_H$ corrected to $N^{H'}$ (or 5 corrected to 5′).

As the $10^2$ decade is decoded, the digit decoded, is stored in a latch circuit for use in determining the action to be taken by the corrective circuitry upon the $10^3$ decade digit when it is decoded.

This signal is applied to 126, 127, or 128 when the $10^3$ decade is decoded. The corrected number of the $10^3$ decade is stored for use as the $N^L$ signal during decoding of the $10^4$ decade, etc. Each decade is, therefore, corrected (if necessary) with respect to the $N^L$ decade, i.e., $10^3$ with respect to $10^2$, $10^4$ with $10^3$ corrected, $10^5$ with respect to $10^4$ corrected, $10^6$ with respect to $10^5$ corrected. The $10^2$ decade digit is assumed correct and is not corrected.

It should be understood that the inputs 130–132 and output 135 are typical of the circuits for each of the 10 digits. The circuit description thus far has been general and based upon $N^L$ and $N^H$ rather than a specific digit assignment.

Figure 4A:
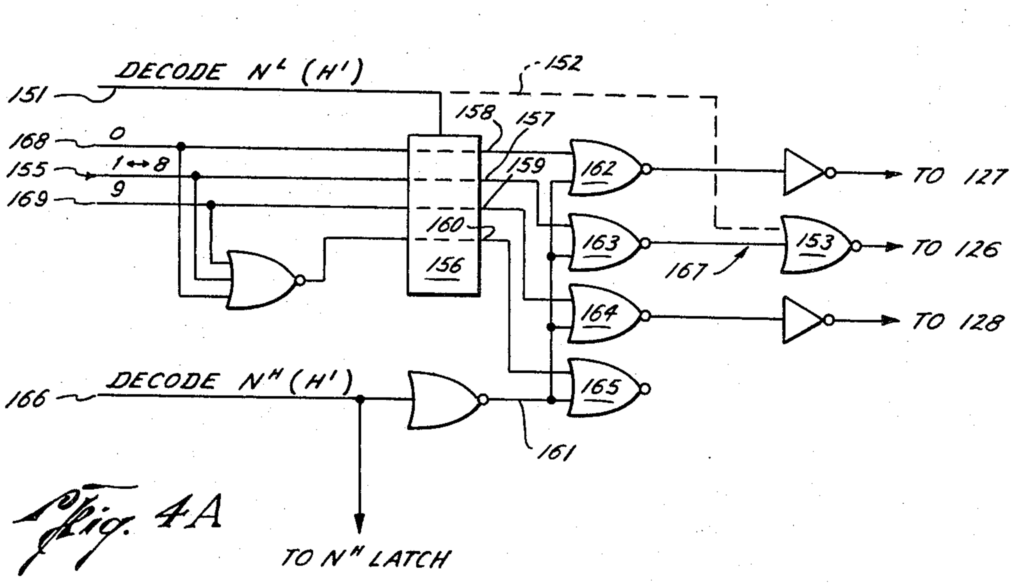
FIG. 4A is an electrical schematic of the logic diagram used with FIG. 4 to store the lower order signals used for decoding and correcting the upper order signals.
Figure 5:
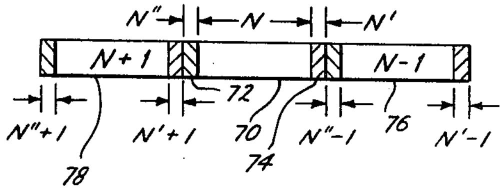
FIG. 5 is an enlarged linear representation illustrating the numbering representation between adjacent numbers as encoded by the switch pattern of FIG. 2.

To expand the description of the corrective technique to include the generation and storage of signals to be used for 126, 127 and 128, refer to FIG. 4A and assume that 130, 131, 132 and 135 are specific digits.

1. In Example 1, it was assumed that $N^H$ was decoded as a number between 1′ and 8″. $N^L$ was also assumed to be the $10^2$ decade in the example.

Recalling that a signal must be applied to 126, 127 or 128 in order to accomplish decoding and that this signal is derived from the next lower order decade; the decoding of $10^2$ must be treated in a special manner since there is no lower order decade from which $N^L$ signals can be derived.

The dotted connection 152 applies to the $10^2$ decade comparator memory circuit only and implements the special treatment as follows:

When the decode $10^2$ signal (Hi) occurs at 151, the output 126 of NOR Gate 153 is forced Lo and enables NOR Gate 138. A data signal on 130, 131 or 132 causes 137 to go Lo and the digit is decoded as previously explained. Note that the $10^2$ decade is always decoded without correction because it is always decoded by the 1′ through 8″ signal.

156 is a quad latch circuit which is enabled by the Hi signal at 151 and, therefore, stores the 155 signal in one latch. The output of this latch, 157, goes Lo. The output 158, 159 and 160 of the three remaining latches remain Hi.

This completes the cycle and the following has been accomplished:

A. The actual digit decoded in the $10^2$ decade has been categorized (1′ – 8″) and stored in latch 156 for use as $N^L$ signal in the $10^3$ decade decoding cycle.

B. The digit was stored without correction by the action of 152 and 153 upon 126. In other words, the $10^2$ decade supplied itself an $N^L$ signal.

When the decode $N^H$ ($10^3$) signal occurs at 166, 161 goes Lo. NOR Gate 163 inputs 157 and an 161 are both Lo and its output 167 goes Hi. NOR Gate 153 output 126 goes Lo, and the cycle is repeated with the digit being categorized and stored in a latch circuit identical to the one shown except for 152.

During the decode $10^4$ cycle this signal is used as $N^L$.

If we had assumed a number 0 or 9 was decoded during the $10^2$ the 154 connection would be to 168 or 169 respectively. Circuit response with respect to storage and subsequent output would have been identical.

The latch circuit shown is typical of one for each decade of the reading. Input lines 168, 165 and 169 and output lines 127, 126 and 128 are common to all of the latches.

The present invention, therefore, is well adapted to carry out the objects and attain the ends and advantages mentioned as well as others inherent therein.

What is claimed is:

1. A digital encoding transducer for providing a digital code corresponding to the angular position of a plurality of rotatable shafts which form a part of a gear type counter comprising, only six brushes connected to each rotatable shaft for rotative movement, a rotary switch pattern for each shaft and positioned to coact with one of the set of six brushes and having a plurality of segments forming a code having only five bits and measuring only 30 angular positions, said segments positioned wherein the change in code between adjacent positions is only one bit, and said segments positioned whereby each brush will contact only one segment at a time.

2. The apparatus of claim 1 wherein the switch pattern is arranged that more than one brush will contact a signal bit segment at a plurality of positions thereby providing a redundant electrical reading of said single bit segment.

3. The apparatus of claim 1 wherein the interface positions are angularly larger than the positional errors.

4. The apparatus of claim 3 wherein the interface positions are no larger than ten percent of the numbered positions.

5. The apparatus of claim 1 wherein said five bit code avoids encoding all ungrounded bits as a number.

6. A digital encoding transducer for providing a digital code corresponding to the angular position of a plurality of rotatable shafts which form a part of a gear type counter comprising, only six brushes connected to each rotatable shaft for rotative movement, a rotary switch pattern for each shaft and positioned to coact with one of the set of six brushes and having a plurality of segments forming a code having only five bits and measuring only thirty angular positions, said thirty positions including 10 numbered positions with each numbered position including an interface position at each end of each numbered position, said interface positions being larger than positional errors of the brushes relative to the switch pattern, said segments arranged such that each brush set always gains or loses a segment in moving from one position to another without a brush simultaneously overlapping two segments, said segments positioned wherein the change in code between adjacent positions is only one bit, an error detecting and correcting circuit including, means for decoding the lowest order switch pattern, means for decoding the next higher switch pattern, means for checking and changing the higher switch pattern output if the higher switch pattern reading is incorrect.

7. The apparatus of claim 6 wherein the switch patterns are formed in five circles.

8. The apparatus of claim 7 wherein two of the brushes rotate around the ground ring, and the ground ring including an opening occupied by another bit segment.

* * * * *